June 21, 1938.   R. E. POLDEN ET AL   2,121,572
SPECTACLE FRAME JOINT
Filed July 13, 1937
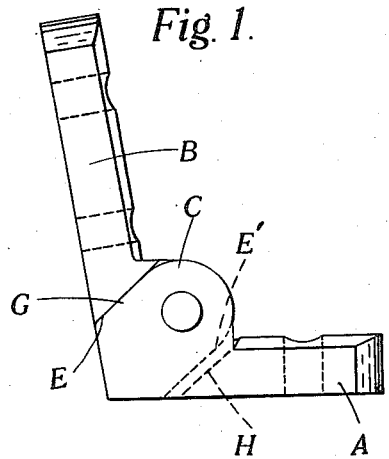
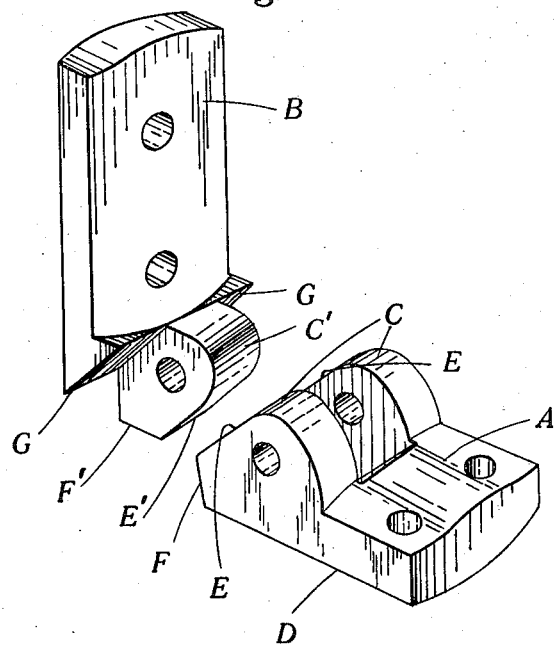
INVENTORS
Reginald Ernest Polden
and William Charles Hawkings
BY
Munn, Anderson & Liddy
ATTORNEYS Patented June 21, 1938

2,121,572

UNITED STATES PATENT OFFICE 2,121,572

SPECTACLE FRAME JOINT

Reginald Ernest Polden, Tolworth, and William Charles Hawkings, Hook, Surbiton, England, assignors to R. E. Polden Limited, London, England Application July 13, 1937, Serial No. 153,306
In Great Britain October 8, 1935

2 Claims. (Cl. 88—53)

This invention relates to spectacle frame joints and more especially to hinge joints for connecting the eyes, or frontal portion of the spectacles to the sides.

The two parts of such a hinge joint are provided with suitable abutting surfaces to form a break and so limit the amount to which the side arm of the spectacles is opened. This is usually arranged so that the two plates lie at an angle which is slightly greater than 90 degrees.

In typical joints according to the present invention each part has a barrel shaped or knuckle portion and a break is formed by using a surface on one part to butt against a surface formed at the inner end of the cut-away portion or portions of the other part occupied by the barrel or barrels of the first part.

Another part of the invention lies in the fact that the break is approximately tangential to the barrel circle or a larger concentric circle at a point which lies further than does the pivot centre from the surface of the plate or from that of the eye to which the hinge is attached.

In a typical construction the profiles of the two parts are similar, a fastening plate having at one end a rounded barrel or knuckle portion with its centre preferably slightly further from the under surface of the plate than the thickness of the latter. The rounded part of the barrel merges into a tangential surface preferably lying at about 45° to the under surface of the plate and terminating at its far end some distance above that surface, according to the slope employed and the proportions of the parts. The profile is completed by a straight or curved portion running down to meet the under surface of the plate. When a part having the above profile is connected to the eye of the spectacles there will be a surface tangential to the barrel and facing outwards at the chosen inclination. The barrels of the two parts are slotted to interengage and form for example a three barrel or five barrel hinge; and in slotting the second part correspondingly inclined faces are formed at the bottom of the slots to engage and butt against the inclined tangential surfaces of the first part when the sides are fully open. The slot or slots in the first part are preferably carried a little deeper so as to leave a small clearance between the correspondingly inclined surfaces at the other side of the barrels.

The break can in some cases lie further away from the pivot centre, with a correspondingly modified profile and deeper slotting.

It may now be noted that the break surfaces in known hinge joints are variously positioned, but except in the case of mitred joints where the break lies in a plane which intersects the pivotal axis and bisects the angle of full opening (hereinafter called for convenience the central plane) the profiles of the two parts of the hinge have been shaped differently and extruded bars of both profiles have usually been used in the manufacture of the joints.

Although the fact is not regarded as of primary importance nevertheless the invention does enable a joint to be made which possesses the novel characteristic that while the break is positioned well outside the central plane, the two parts are nevertheless of the same profile. It may also be convenient in some cases to have the plates differently shaped, the barrels and adjacent portions only being of similar profile.

Other parts of the invention are embodied in a specific form of hinge joint which will now be described by way of example with reference to the accompanying drawing, the novel features being pointed out in the accompanying claims.

In the drawing,

Fig. 1 is a side view of the hinge in its fully open position, and

Fig. 2 is a perspective view of the two parts of the hinge separated.

Referring to the drawing, the hinge comprises two hinge parts or plates A and B respectively which are formed from bars of the same profile but the plate of the part A is reduced in length. The part A, which is for attachment to the eye of the spectacles, is formed with two barrel portions or knuckles C, the centre of each barrel or knuckle C being slightly farther from the under surface D of the plate A than the thickness of the latter.

The rounded part of each barrel or knuckle C towards its lower end merges into a tangential abuttable portion E which lies at an angle of about 45 degrees to the outer surface D of the plate A. The profile is completed by a straight portion F running down to meet the outer surface D at an angle slightly greater than 90 degrees.

The part B, which is for attachment to a side arm or temple of the spectacles, is provided with a single, centrally arranged barrel or knuckle portion C' and with portions E' and F' similar in outline to the portions E and F respectively of the part A.

A straight break or abuttable surface G, arranged parallel to the portion E' and occurring on the plate B, is provided on each side of the barrel or knuckle portion C' and when the hinge is in the fully open position as shown in Fig. 1 the two surfaces E of the knuckles C on the plate A abut the two break surfaces G. The previously mentioned under surface D of the plate A is now, for convenience in definition, called the outermost surface, the corresponding surface of the plate B being correspondingly identified. It is these outermost surfaces which are on a common plane with the heels, so to speak, of the respective knuckles, and when the hinge is open the common plane of one plate aligns with the angular end of the knuckle of the adjacent plate. The knuckle C' is housed in the slot formed between the two knuckles C, the slot being formed a little deeper than the knuckle C' to leave a small clearance between the portion E' and an inclined surface H formed at the inner end of the slot and arranged approximately parallel to the portions E.

Although the plates A and B have been described as for use on the eye and the side arm temple of the spectacles respectively, they may, of course, with slight modification of length, be interchanged. It will also be understood that the other details which have been described have been given by way of example only, and that the invention includes all such embodiments as come within the ambit of the accompanying claims.

We claim:—

1. A spectacle hinge joint comprising a pair of plates, said plates having knuckles and a hinge pin connecting said knuckles, one of the plates having an abuttable surface to engage a matching abuttable surface of a hinge knuckle of the other plate, the outermost surfaces of each plate and the respective knuckle being in a common plane, each knuckle having an angular end, and the angular ends of the knuckles of each plate aligning with the common plane of the other plate when the hinge is open.

2. A spectacle hinge joint comprising a pair of plates, said plates having knuckles and a hinge pin connecting said knuckles, one of the plates having an abuttable surface to engage a matching abuttable surface of a hinge knuckle of the other plate, the outermost surfaces of each plate and the respective knuckle being in a common plane and at an obtuse angle to the common plane of the other plate and knuckle when the hinge is open, each knuckle having an angular end, and the angular ends of the knuckles of each plate aligning with the common plane of the other plate also when the hinge is open.

REGINALD ERNEST POLDEN.
WILLIAM CHARLES HAWKINGS.